Patented Jan. 4, 1944

2,338,106

UNITED STATES PATENT OFFICE 2,338,106

PROCESS FOR THE PRODUCTION OF NEW EFFICACIOUS p-AMINO-BENZENE-SULPH-AMIDE DERIVATIVES SUITABLE FOR INJECTION PURPOSES

Zoltán Földi, Budapest, Hungary; vested in the Alien Property Custodian

No Drawing. Application February 5, 1938, Serial No. 188,958. In Hungary February 13, 1937

7 Claims. (Cl. 260—397.7)

Chemical compounds of the amino-benzene-sulphamide type are extensively used in therapy, particularly for diseases due to streptococcic infection. However, p-amino-benzene-sulphamide is only to a very slight extent soluble in water and it is therefore unsuitable for preparing solutions of the necessary concentration. Neither are the salts formed by the said compounds with acids, suitable for preparing solutions intended for injection, because their aqueous solutions possess a strong acid property.

According to my present invention it is possible to obtain p-amino-benzene-sulphamide derivatives readily soluble in water and suitable for injection purposes, if p-amino-benzene-sulphamide, or such derivatives of the same as result from substitutions effected in the nucleus or in the nitrogen atoms are subjected to the action of formaldehyde sulphoxylate.

It has been found to be particularly advantageous to perform the reaction of the formaldehyde sulphoxylate in the presence of about 1 mol of alkali metal hydroxyde, in which case products, extremely soluble in water, are formed, which can be easily isolated from the reaction mixture by addition of mineral acid, whereupon an acid difficulty soluble in water will separate. If this acid is filtered off, washed with water and then neutralized by means of alkali metal hydroxides, as for instance, by sodium hydroxide, an aqueous solution of the product results in which product practically two atoms of sulphur correspond to two atoms of nitrogen, i. e., in which product 1 mol of amino-benzene-sulphamide is connected with 1 mol of formaldehyde sulphoxylate. Thus for instance 50 grams of p-amino-benzene-sulphamide are dissolved in a mixture of 70 ccm. of water and of 20 to 25 ccm. of a 47 per cent by volume sodium hydroxide solution by heating in a water-bath, and after cooling a solution of 50 to 100 grams of formaldehyde sodium-sulphoxylate in 100 to 200 ccm. of water is added. This mixture is heated at a temperature of 60 to 80° C. for one hour, then the solution is cooled and to the filtered solution hydrochloric acid is added until a filtered test portion will not produce any further precipitate on the addition of hydrochloric acid. The precipitate is collected on a suction funnel, preferably excluded from air, and washed with water. The wet acid when neutralised with a solution of sodium hydroxide, gives a solution of the sodium salt which is easily soluble in water. It is, however, also possible to dry the acid in vacuo over phosphorus pentoxide and to effect the formation of the salt in an alcoholic medium.

If no sodium hydroxide is employed during the action of the sulphoxylate, only a very slow reaction will take place between the sulphoxylate and the amino-benzene-sulphamides (amino-benzene sulphamide, benzylamino - benzene - sulphamide, amino-benzene-disulphamide, etc.). In this case it will be preferable to employ the sulphoxylate in a large excess, e. g., two mols of sulphoxylate per mol of amino-benzene-sulphamide. Such a reaction mixture has an alkaline reaction, owing to the hydrolysis of the excess of sulphoxylate. In this case the heating of the reaction mixture (50 grams of p-amino-benzene-sulphon-amide, 75 grams of formaldehyde sodium sulphoxylate, free from water of crystallisation, and 100 ccm. of water) should be continued in a water bath of 70 to 90° C. for about 20 hours. The product formed during this process is likewise most easily soluble in water, but when acidified with mineral acids no free acid will precipitate. The isolation of the product from this reaction mixture is preferably effected by pouring it into a quantity of absolute alcohol amounting to between 6 and 10 times the quantity of the reaction mixture, whereupon the product precipitates in the form of a gummy mass. After allowing the mixture to stand for a while, the liquid is decanted, fresh absolute alcohol is poured to the gummy residue, whereupon the latter becomes converted into a white powdery mass. After drying, a substance very easily soluble in water is obtained; the chemical analysis shows the presence of about 3 atoms of sulphur for each two atoms of nitrogen, i. e., in this product 2 groups of sulphoxylate are joined to 1 mol of amino-benzene-sulphamide. The product contains varying amounts of water of crystallisation. About 3 mols of water of crystallisation were found.

The presence of the sulphoxylate groups can easily be shown by titration by means of indigo carmine.

The chemical compounds containing two groups of sulphoxylate will offer in its aqueous solutions much greater a resistance to the effects of air than the derivatives containing only one sulphoxylate group. The reaction of the solutions to litmus is alkaline, but to phenol phthaleine practically neutral thus remaining within a reaction range very suitable for solutions intended for injection purpose.

The products of the process are employed for pharmaceutical purposes.

What I claim is:

1. Para-(N-sodium methylene-sulphinate)-amino benzene-sulphonamide.

2. The process of producing new compounds which comprises reacting sulphanilamide with sodium-formaldehyde-sulphoxylate in equimolecular proportions and in an aqueous medium to produce the N-methylene sulphinate of sulphanilamide, the reaction being effected in an alkaline solution.

3. The process of producing new compounds which comprises reacting sulphanilamide with sodium-formaldehyde-sulphoxylate in equimolecular proportions and in an aqueous medium in the presence of a mol of alkali-metal hydroxide to produce the N-methylene sulphinate of sulphanilamide.

4. A method of producing new compounds from sulphanilamide and an alkali metal-formaldehyde-sulphoxylate comprising heating an equimolecular mixture of sulphanilamide and alkali metal-formaldehyde-sulphoxylate in an aqueous medium in the presence of an alkali-metal hydroxide for a period of time sufficient to effect a combining reaction between the sulphanilamide and the alkali metal-formaldehyde-sulphoxylate, cooling the reaction mixture, filtering, adding a mineral acid to the filtrate to form a precipitate, and separating the precipitate formed.

5. A method of producing new compounds from sulphanilamide and an alkali metal-formaldehyde-sulphoxylate comprising heating an equimolecular mixture of sulphanilamide and alkali metal-formaldehyde-sulphoxylate in an aqueous medium in the presence of an alkali-metal hydroxide for a period of time sufficient to effect a combining reaction between the sulphanilamide and the alkali metal-formaldehyde-sulphoxylate, cooling the reaction mixture, filtering, adding a mineral acid to the filtrate to form a precipitate, separating the precipitate formed, and dissolving the precipitate in an alkali-metal hydroxide solution.

6. A method of producing new compounds from sulphanilamide and an alkali metal-formaldehyde-sulphoxylate comprising heating an equimolecular mixture of sulphanilamide and alkali metal-formaldehyde-sulphoxylate in an aqueous medium in the presence of an alkali-metal hydroxide for a period of time sufficient to effect a combining reaction between the sulphanilamide and the alkali metal-formaldehyde-sulphoxylate, cooling the reaction mixture, adding a hydrochloric acid solution thereto to form a precipitate of the acid component of the compound produced by the reaction, and separating the precipitate.

7. A method of producing new compounds from sulphanilamide and an alkali metal-formaldehyde-sulphoxylate comprising heating an equimolecular mixture of sulphanilamide and alkali metal-formaldehyde-sulphoxylate in an aqueous medium in the presence of an alkali-metal hydroxide for a period of time sufficient to effect a combining reaction between the sulphanilamide and the alkali metal-formaldehyde-sulphoxylate, cooling the reaction mixture, adding a hydrochloric acid solution thereto to form a precipitate of the acid component of the compound produced by the reaction, separating the precipitate, and dissolving the precipitate in an alkali-metal hydroxide solution to form an alkali-metal salt of the acid form of said compound.

ZOLTÁN FÖLDI.